(12) United States Patent
Stevens (10) Patent No.: US 9,819,828 B2
(45) Date of Patent: Nov. 14, 2017

(54) NON-PRINTING DOT HALFTONE PATTERNS

(71) Applicant: Xerox Corporation, Norwalk, CT (US)

(72) Inventor: Michael Dale Stevens, Portland, OR (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 15/070,055

(22) Filed: Mar. 15, 2016

(65) Prior Publication Data

US 2017/0272610 A1    Sep. 21, 2017

(51) Int. Cl.
H04N 1/60 (2006.01)
G06K 15/00 (2006.01)
H04N 1/405 (2006.01)
H04N 1/52 (2006.01)

(52) U.S. Cl.
CPC .......... H04N 1/4055 (2013.01); H04N 1/52 (2013.01); *H04N 2201/0094* (2013.01)

(58) Field of Classification Search
None
See application file for complete search history.

(56) References Cited

U.S. PATENT DOCUMENTS

| | | | |
|---|---|---|---|
| 4,916,545 A * | 4/1990 | Granger | H04N 1/4058 358/3.09 |
| 5,202,772 A * | 4/1993 | Muir | H04N 1/4058 358/1.9 |
| 6,072,591 A * | 6/2000 | Harrington | B41B 15/00 358/1.9 |
| 6,072,592 A * | 6/2000 | Ashworth | G03F 5/00 358/1.9 |
| 6,266,157 B1 * | 7/2001 | Fan | H04N 1/4053 358/1.9 |
| 7,016,073 B1 * | 3/2006 | Meyer | G03G 15/0803 358/1.9 |
| 7,016,082 B2 | 3/2006 | Rozzi | |
| 7,880,932 B2 | 2/2011 | Ishii et al. | |
| 7,978,371 B2 * | 7/2011 | He | H04N 1/52 358/1.9 |
| 8,132,508 B2 | 3/2012 | Samworth et al. | |
| 8,654,400 B2 | 2/2014 | Cave | |
| 2006/0164659 A1 * | 7/2006 | Foster | H04N 1/405 358/1.1 |

(Continued)

*Primary Examiner* — Madelein Nguyen
(74) *Attorney, Agent, or Firm* — Gibb & Riley, LLC (57) ABSTRACT

A special-purpose image processor can convert an electronic file into a bitmap by generating printing halftone dots within the bitmap based on locations of colors within the electronic file, and generating non-printing dots within the bitmap. A printing apparatus can print the bitmap, by not print marking materials where the non-printing dots are positioned within the bitmap. The special-purpose image processor can generate the non-printing dots within the bitmap by increasing the size of the printing halftone dots until they contact one another, or generating printing lines that connect the printing halftone dots to each other within the bitmap. Also, the special-purpose image processor can generate, as each printing halftone dot, a higher frequency pattern of printing dots, where the non-printing dots are generated to have a lower frequency pattern relative to that higher frequency.

16 Claims, 11 Drawing Sheets

(56) References Cited

U.S. PATENT DOCUMENTS

| | | | | |
|---|---|---|---|---|
| 2006/0256385 A1* | 11/2006 | Takebe | ............... | H04N 1/4055 358/3.06 |
| 2006/0290731 A1* | 12/2006 | Ishii | ............... | H04N 1/4055 347/15 |
| 2008/0117464 A1* | 5/2008 | Crounse | ............... | H04N 1/4051 358/3.03 |
| 2009/0207433 A1* | 8/2009 | Wang | ............... | G06F 17/214 358/1.11 |
| 2009/0296175 A1* | 12/2009 | Conrow | ............... | H04N 1/6033 358/534 |
| 2010/0020339 A1* | 1/2010 | He | ............... | H04N 1/54 358/1.9 |
| 2010/0039657 A1* | 2/2010 | Wang | ............... | H04N 1/4078 358/1.9 |
| 2010/0150433 A1* | 6/2010 | Wang | ............... | H04N 1/00864 382/162 |
| 2012/0106835 A1* | 5/2012 | Bernal | ............... | H04N 1/52 382/162 |
| 2012/0224229 A1* | 9/2012 | Yoshida | ............... | G06K 7/1447 358/3.06 |
| 2013/0019767 A1* | 1/2013 | Sanger | ............... | B41M 3/14 101/170 |
| 2013/0188204 A1* | 7/2013 | Ortiz Segovia | ............... | H04N 1/52 358/1.9 |
| 2015/0146261 A1* | 5/2015 | Subbaian | ............... | H04N 1/4051 358/3.06 |

\* cited by examiner

NON-PRINTING DOT HALFTONE PATTERNS

BACKGROUND

Systems and methods herein generally relate to printers and printer systems, and more particularly to creating bitmaps used in printing.

Halftoning techniques are widely employed in the printing and display of digital images, and are used because the physical processes involved are binary in nature or because the processes being used have been restricted to binary operation for reasons of cost, speed, memory, or stability in the presence of process fluctuations. The term halftoning refers to a process of representing an image as a bi-level image such that, when viewed from a suitable distance, it gives the same impression as the original image. Halftoning reduces the number of quantization levels per pixel in a digital image. Over the long history of halftoning, a number of halftoning techniques have been developed which are adapted for different applications.

Classical halftone screening applies a mask of threshold values to each color of the multi-bit image. Such thresholds are stored as a matrix in a repetitive pattern. Each tile of the repetitive pattern of the matrix is a halftone cell. Digital halftones generated using threshold arrays that tile the image plane were originally designed to be periodic for simplicity and to minimize memory requirements. With the increase in computational power and memory, these constraints become less stringent. Digital halftoning uses a raster image or bitmap within which each monochrome picture element or pixel may be on or off (ink or no ink). Consequently, to emulate the photographic halftone cell, the digital halftone cell contains groups of monochrome pixels within the same-sized cell area.

To keep the same appearance at each color level, the halftone dot sizes used are smaller, and the amount of toner used is smaller. An issue with high frequency or stochastic screens is that they can appear unstable or noisy when used in laser printers. If the pattern is stochastic with irregular spacing between the dots, the appearance can be quite noisy.

SUMMARY

Exemplary methods herein receive an electronic file into a special-purpose image processor. Such methods convert the electronic file into a bitmap using the special-purpose image processor by generating printing halftone dots having a first frequency within the bitmap based on locations of colors within the electronic file, and generating potentially larger non-printing dots having a second frequency less than the first frequency within the bitmap. Further, such methods print the bitmap using a printing device by printing the marking materials on print media where the printing halftone dots are positioned within the bitmap, but not printing the marking materials where the non-printing dots are positioned within the bitmap.

The process of generating the non-printing dots within the bitmap can include a process of increasing the size of the printing halftone dots until they contact one another, or generating printing lines that connect the printing halftone dots to each other within the bitmap. Also, the process of generating printing halftone dots can include a process of generating, as each printing halftone dot cluster, a higher frequency pattern of printing dots.

Various printing apparatuses herein include (among other components) a special-purpose image processor that receives an electronic file. The special-purpose image processor converts the electronic file into a bitmap by generating printing halftone dots within the bitmap based on locations of colors within the electronic file, and generating non-printing dots within the bitmap. Such printing apparatuses also include any form of printing engine that prints the bitmap by printing marking materials on print media where the printing halftone dots are positioned within the bitmap, but not printing the marking materials where the non-printing dots are positioned within the bitmap.

Thus, the special-purpose image processor can generate the non-printing dots within the bitmap by increasing the size of the printing halftone dots until they contact one another, or generating printing lines that connect the printing halftone dots to each other within the bitmap. Also, the special-purpose image processor can generate the printing halftone dots by generating, as each printing halftone dot cluster, a higher frequency pattern of printing dots.

Exemplary systems herein include (among other components) one or more special-purpose image processor devices receiving an electronic file. The special-purpose image processor devices convert the electronic file into a bitmap by generating printing halftone dots within the bitmap based on locations of colors within the electronic file, and generating non-printing dots within the bitmap. Such systems also include one or more printing devices directly or indirectly connected to the special-purpose image processor devices. The printing devices print the bitmap by printing the marking materials on print media where the printing halftone dots are positioned within the bitmap, but not printing the marking materials where the non-printing dots are positioned within the bitmap.

More specifically, the special-purpose image processor device can generate the non-printing dots within the bitmap by increasing the size of the printing halftone dots until they contact one another, or generating printing lines that connect the printing halftone dots to each other within the bitmap. Also, the special-purpose image processor device can generate the printing halftone dots by generating, as each printing halftone dot cluster, a higher frequency pattern of printing dots.

These and other features are described in, or are apparent from, the following detailed description.

BRIEF DESCRIPTION OF THE DRAWINGS

Various exemplary systems and methods are described in detail below, with reference to the attached drawing figures, in which.

DETAILED DESCRIPTION

Hardware and software system accommodate halftone rendering through the use of threshold arrays. For example, color printers can have four or more color channels, each with an associated threshold array. The values in each array are generated by means of a chosen spot function to create the dot shapes at each color level. This is normally a spatial function of the relative pixel location in a halftone cell, and can have a circular, elliptical, or some other shape. The values in the threshold array are mapped to each pixel location at coordinates to be printed. The hardware or software compares input color values with the values in the threshold arrays. If the input color value is greater than or equal to the threshold, the pixel is marked at that location. The arrays can be rectangular in shape, and use tiling to cover the page area being printed.

Figure 1:
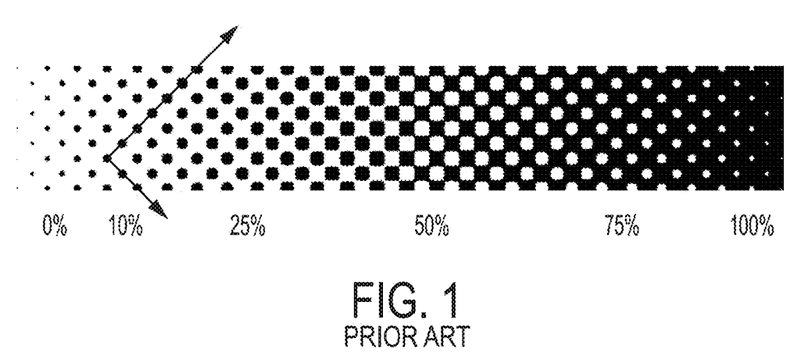
FIG. 1 is a schematic diagram illustrating a clustered halftone dot pattern at different frequencies.

Laser printer halftone patterns are a set of clustered dot patterns with each toner color having a unique frequency and angle. An example of a clustered dot screen is shown in FIG. 1, where the angles between dots (shown by the arrows in FIG. 1) are 45° and 135°. Here, the spot function is: $K(x,y) \sim A*\cos(2*Pi*x)+B*\cos(2*Pi*y)$. The ratio A/B controls the elliptical amount of the dot shape. For the example in FIG. 1: A=B=0.5, which forms a circular dot shape. Here, (x) is the relative pixel distance in the scan direction, and (y) is the relative pixel distance in the process direction from a center point in each halftone cell.

The laser print development is smoother and has a stable appearance if the dots are larger and the frequency is lower. Large, low frequency dots are also more visible. Large dots also have a higher density of toner in the center area, and a larger surrounding white area that is not marked.

Figure 2:
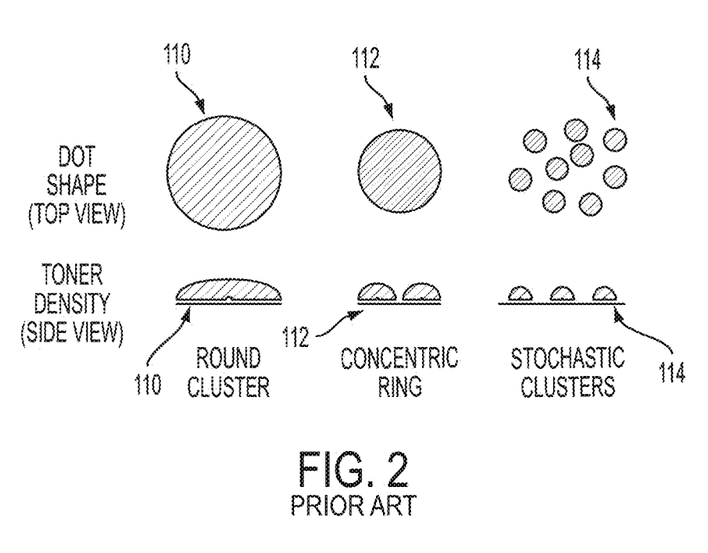
FIG. 2 is a schematic diagram illustrating different halftone dot clusters.

FIG. 2 is a schematic diagram illustrating different halftone dots and shows the profile of the toner in a circular halftone dot 110 from top and side views. On the finished page, after fusing onto paper, these dots may not be thicker in the center as shown, but they do have more density in the center. Fusing causes the dots to spread more, producing dot gain with less density along the edges. FIG. 2 also illustrates clustered dots 112 with holes or rings help to reduce the maximum density in the center and high frequency and stochastic screens 114 that use smaller dots. The use of a high frequency clustered dot, or a stochastic pattern limits excess toner density in the dot centers. This is due to the clusters having a smaller diameter with closer spacing between dots. Stochastic and frequency modulated (FM) screen patterns have small dots made of single pixels, or of a few pixels forming clusters. The screens are designed to control the colored and uncolored (white) dot sizes and dot shapes.

One feature of high frequency and stochastic screening is that the dots are small. With small dots, there is a higher perimeter to area ratio, so there is extra coverage from more dots spreading. To keep the same appearance at each color level, the halftone dot sizes used are smaller, and the amount of toner used is smaller. An issue with high frequency or stochastic screens is that they can appear unstable or noisy when used in laser printers. If the pattern is stochastic with irregular spacing between the dots, the appearance can be quite noisy.

In order to address such issues, the methods and devices herein utilize non-printing (e.g., white) halftone dots that are formed by surrounding the non-printing halftone dot area with printing. For convenience, sometimes the non-printing halftone dots are referred to as "white" dots; however, such terminology does not indicate that white toner (or other white marking material) is utilized. Instead, the term "white" here generally refers to the color of the print media that will be utilized, because standard copies/print paper is often referred to as white paper. In the absence of any application of marking materials, the print media will remain unaltered (uncolored, unmarked) allowing the print media color (generally classified as white) to remain visible, resulting in the phrase "white dots" meaning non-printed dots.

The method and devices herein connect the nearest neighbor printing halftone dot centers with printing lines to create the non-printing halftone dots. For example, a modified Pellar growth function can be used to create a pincushion shape at each dot with the corners extending connect to neighbor dots (e.g., $K(x,y) \sim A*\cos(Pi*xf(x))+B*\cos(Pi*yf(y))$ such that $f(k) \sim 1-c*kp$). There must be enough concentration of charge developed on the transfer belt to attract sufficient toner particles. For this reason, the methods and devices herein output a bitmap that contains a minimum area in the printing dots as well as a minimum thickness for the printing lines.

In the example shown in the FIGS. 3A-3D, which are schematic diagrams illustrating bitmaps produced herein, the spot function is the modified Pellar function shown above. Some exemplary parameters are A=0.5, =B=0.5, p=0.1, and c=1.0. Since, in this example, A=B, the dots tend to be circular.

Figure 3A:
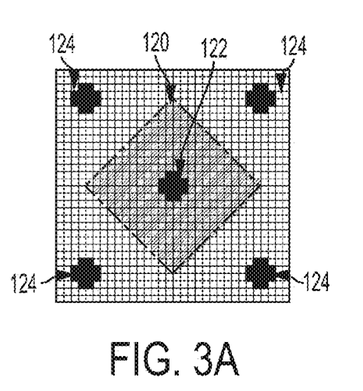
FIGS. 3A-3D are schematic diagrams illustrating bitmaps produced herein.
Figure 3B:
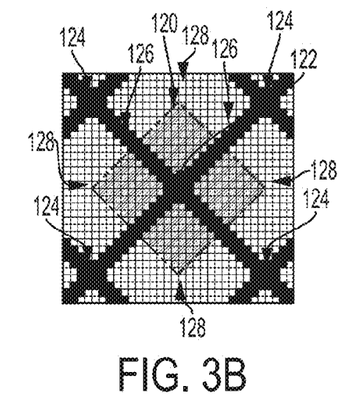
Figure 3C:
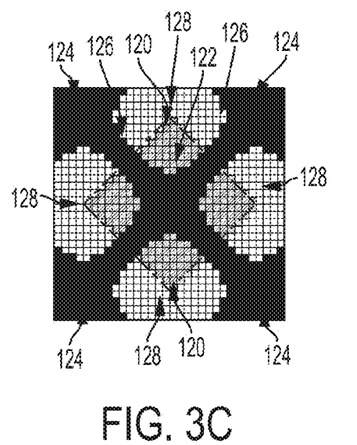

More specifically, FIG. 3A shows a printing dot 122 that is first formed in the center of a printing halftone cell 120. In FIG. 3A, for clarity, only one of the printing halftone cells is shown (as printing halftone cell 120) and the other printing dots 124 that are immediately adjacent to the printing dot 122 of printing halftone cell 120 belong to different printing halftone cells. Because the printing dots 122, 124 are immediately adjacent the very next printing dots in the halftone pattern, there are not any intervening printing dots in-between such printing dots 122, 124. FIGS. 3B and 3C illustrate the lines 126 that are added to the standard bitmap by the methods and devices herein to define/create the non-printing halftone dots 128. The added lines 126 establish the perimeters of the non-printing dots 128 that are overlaid on the bitmap of printing dots 122, 124.

Figure 3D:
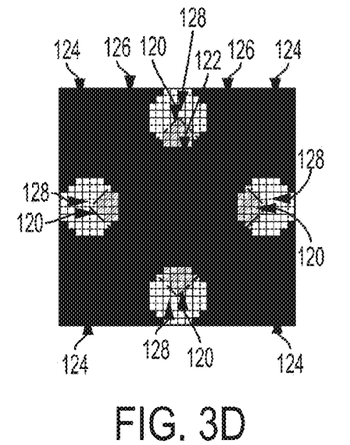

Thus, as shown in FIG. 3B, the lines 126 join (connect) the various printing dots 122, 124. Further, as shown in FIGS. 3C and 3D, the lines 126 can be grown thicker by the methods and devices herein to reduce the size of non-printing halftone dots 128. More specifically, for darker color levels, as shown in FIG. 3D, the lines 126 can be grown thicker to make the non-printing dots 128 smaller (in FIG. 3D, the shaded area 124, 126 in-between the non-printing halftone dots 128 covers more area). To the contrary, thinner lines 126 and smaller printing dots 122, 124, as shown in FIGS. 3B and 3C improve toner distribution by using smaller printing dots 122, 124 and printing lines 126. Connecting the dots 122, 124 of a low to mid frequency pattern with line segments 126 especially helps to improve the distribution in the light color levels, relative to the distribution in the medium and darker color levels.

Figure 4A:
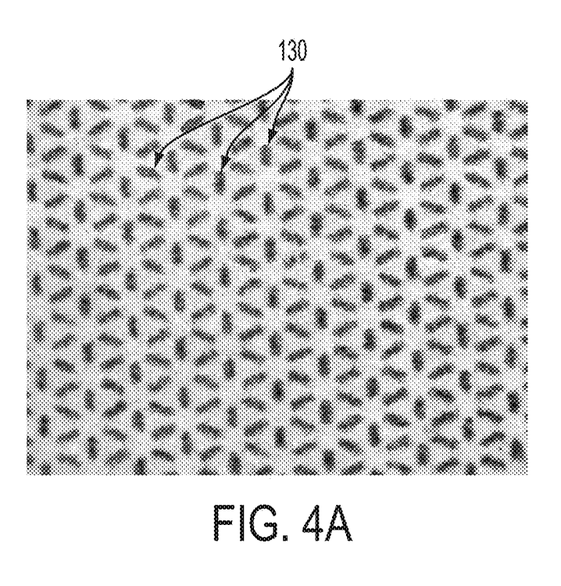
FIGS. 4A-4B are schematic diagrams illustrating printing produced herein.
Figure 4B:
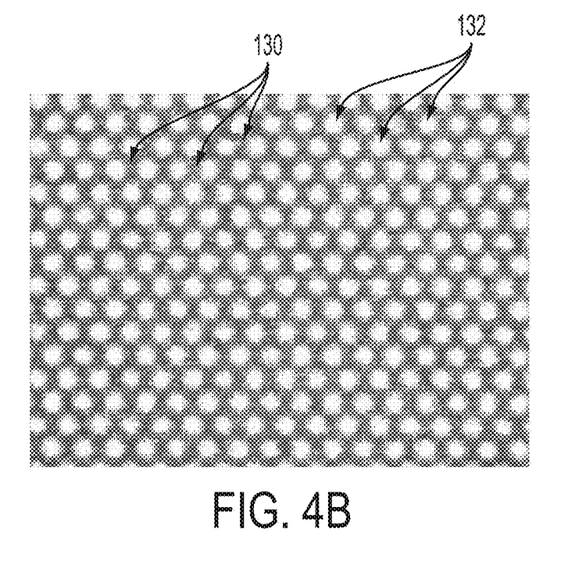

Extending the corners to touch (as shown in FIGS. 3B-3D) is not the only way methods and devices herein form non-printing halftone dots. More specifically, other processing herein forms printing line segments 130 (FIG. 4A) in-between non-printing halftone dot centers 132 (FIG. 4B). FIGS. 4A-4B are schematic diagrams illustrating printing produced herein. FIG. 4B shows the same as FIG. 4A, but at a darker level where the printing line segments 130 are now thick enough to join to form the non-printing halftone dots 132. This particular dot pattern is a hex pattern, where there are six immediately adjacent neighbor dots surrounding each dot. FIG. 4B shows how the separation between non-printing halftone dots 132 does not have a large area in-between (as contrasted to FIG. 3D, where there are large areas in-between). In these types of bitmaps, the ratio of perimeter to area is higher, which helps to spread each dot and distribute the coverage.

Figure 5A:
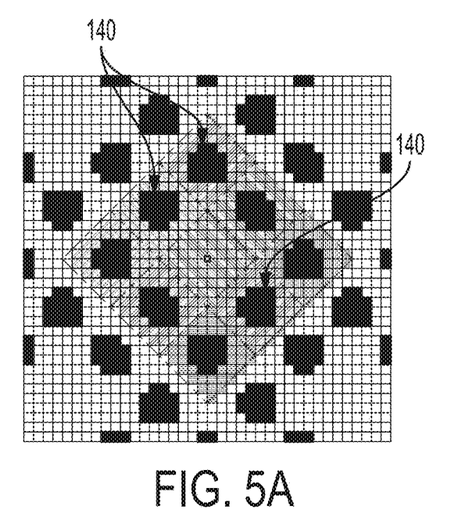
FIGS. 5A-5B are schematic diagrams illustrating bitmaps produced herein.
Figure 5B:
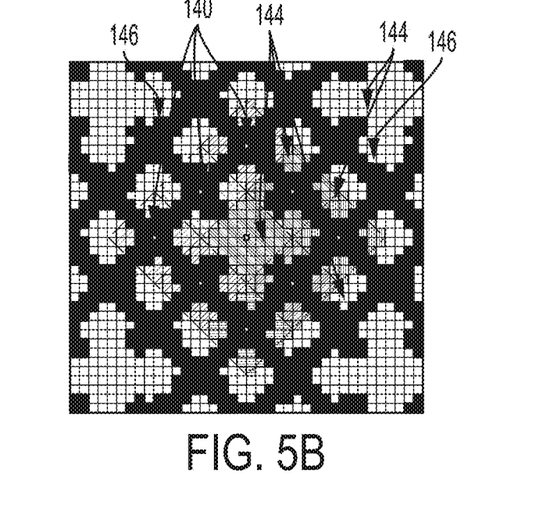

FIGS. 5A-5B, which are schematic diagrams showing bitmaps produced herein, illustrate that devices and methods herein also produce bitmaps having printing high frequency halftone dots 140 (FIG. 5A) and non-printing high frequency halftone dots 144 (FIG. 5B) formed within a surrounding pattern, and this provides a more uniform distribution in the middle to dark colors because the dots are smaller. The high frequency dot patterns 140 that are generated by devices and methods have dot frequencies that are a multiple (harmonic) of the non-printing halftone dots frequencies, and also are selected to be moiré free, when combined with other screens.

More specifically, the low frequency non-printing dots 144 coincide with printing dots 140 of the high frequency patterns in a periodic pattern at a lower frequency. That is, the non-printing white dots 144 act to periodically erase individual high frequency printing dots 140. There are two frequency vectors in each halftone pattern. One for each direction of periodically spaced set of clustered dots. The vectors may not be equal, and may not be orthogonal. The high frequency can be a multiple of the low frequency pattern along one vector, and a different multiple along the other vector. In general, the formula is: $F_{H1}=F_{L1} \times m1 + F_{L2} \times n1$, and $F_{H2}=F_{L1} \times (-m2) + F_{L2} \times n2$, where m1, m2, n1, n2 are integers and $F_{H1}$ and $F_{H2}$ are the high frequency vectors, and $F_{L1}$ and $F_{L2}$ are the low frequency vectors. Additionally, m1 or n1 must be greater than 2, and m2 or n2 must be greater than 2. This is to preserve the high frequency dot pattern 140 between low frequency non-printing dots 144. For the examples here, where the high frequency is 3× the low frequency, m1=3, n1=0, m2=0, and n2=3.

Figure 6:
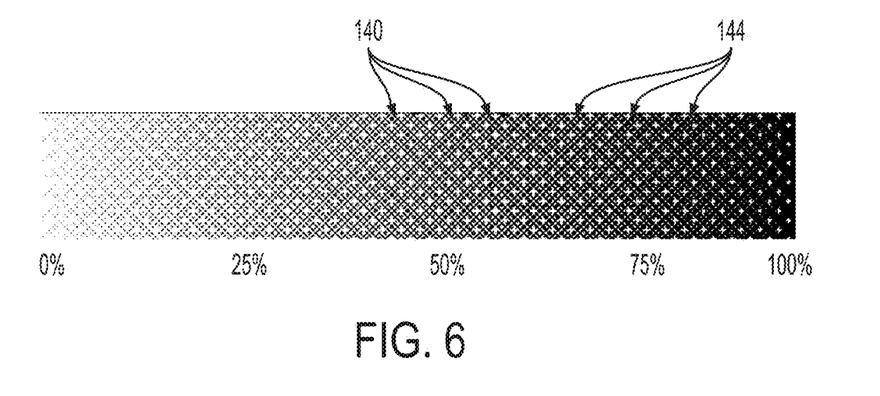
FIG. 6 is a schematic diagram illustrating a halftone dot pattern at different frequencies produced herein.

The examples in FIGS. 5A-5B (and FIG. 6 discussed below) generate halftone dots 140, having frequency vectors at a multiple of (e.g., 3 times) the frequencies of the non-printing halftone dots 144 frequencies. This example is accomplished by not marking every 3rd dot in each direction. In this example, the halftone dots 140 start round to elliptical, and grow to join at the corners (potentially by adding lines 146, as discussed above with respect to FIGS. 3B-3D) to form small non-printing halftone dots 144 in-between, as shown in FIG. 5B. FIG. 6, which is a schematic diagram illustrating a halftone dot pattern with the mixture of high and low frequencies produced herein, shows how this dot pattern appears from non-color level (0%) to a fully saturated level (100%).

Figure 7A:
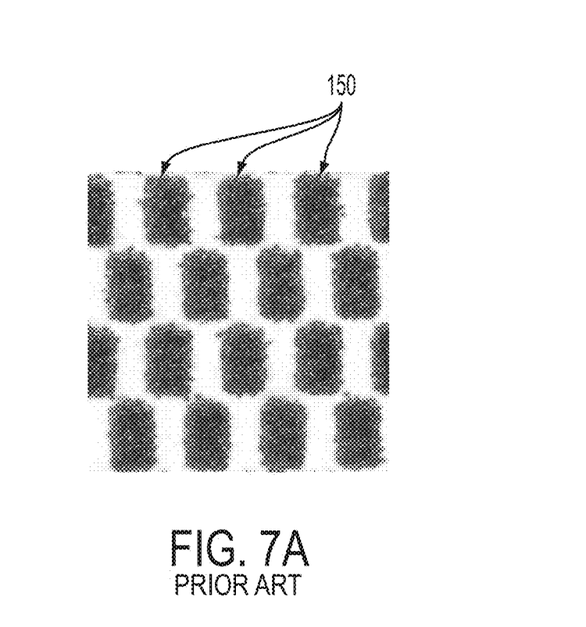
FIGS. 7A-7D are schematic diagrams illustrating printing produced herein.
Figure 7B:
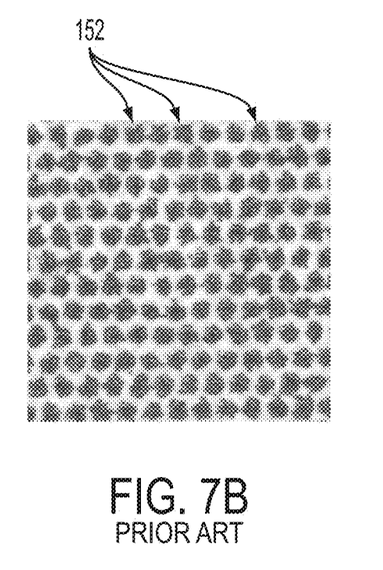
Figure 7C:
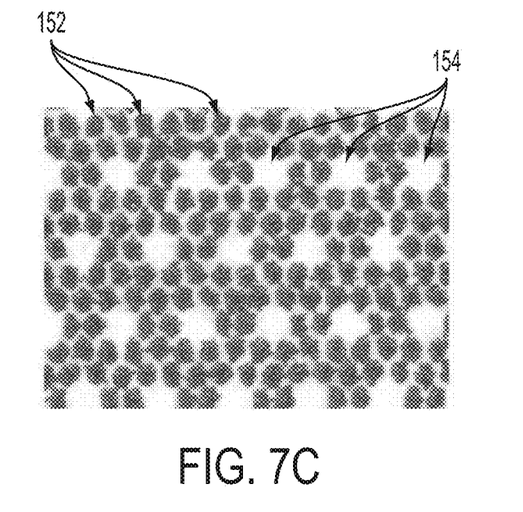
Figure 7D:
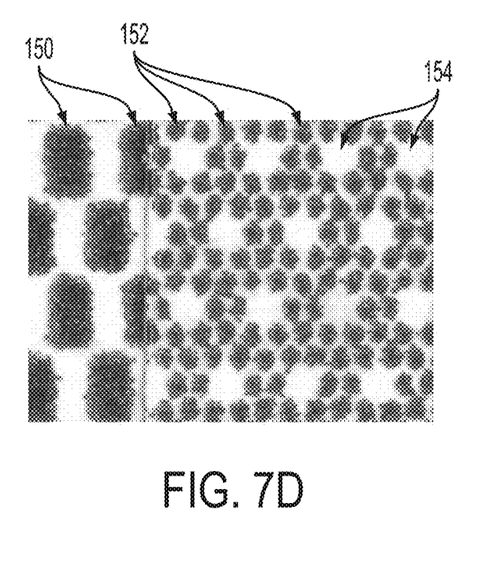

FIGS. 7A-7D, which are schematic diagrams illustrating printing produced herein, illustrate halftone dot patterns. More specifically, FIG. 7A illustrates conventional relatively low frequency printing halftone dots 150; FIG. 7B illustrates conventional relatively high frequency clustered dots 152; FIG. 7C illustrates non-printing halftone dots 154 overlaid on the high frequency printing halftone dots 152 (similar to FIGS. 5A-5B) produced by methods and devices herein; and FIG. 7D is a side-by-side illustration the conventional low frequency printing halftone dots 150 next to the non-printing halftone dots 154 overlaid on the high frequency printing halftone dots 152 generated by methods and devices herein.

More specifically, the left and right side of FIG. 7D are shades that are visually matched. The low frequency printing halftone dots are darker, and very stable. The non-printing halftone dots 154 overlaid on the high frequency printing halftone dots 152 lose some of this smoothness, but the non-printing halftone dots 154 overlaid on the high frequency printing halftone dots 152 are much better looking than the high frequency printing halftone dots 152 by themselves. This reduces the amount of marking material utilized, without producing unstable or noisy printed output. The centers of the printing halftone dots 150, 152 in the left and right sides of FIG. 7D illustrates that the low frequency printing halftone dots 150 have a large area of high density, and the high frequency printing halftone dots 152 have less toner density. This shows that the non-printing halftone dots provide more uniform distribution of toner with lighter density and better area coverage than low frequency dots alone. Therefore, compared to low to mid frequency screens, toner usage is reduced with the non-printing halftone dots generated by the devices and methods herein because the dots are not as dense. Also, with lighter dots, and better distribution, color mixing is improved with more visibility of the underneath colors. The visibility of the low frequency pattern is reduced when mixed with a high frequency pattern, and the stability of the patterns on a printed page is better than with a high frequency screen by itself.

Thus, to keep the same appearance at each color level, the halftone dot sizes used are smaller, and the amount of toner used is less. An issue with high frequency or stochastic screens is that they can appear unstable or noisy when used in laser printers. If the pattern is stochastic with irregular spacing between the dots, the appearance can be quite noisy. Methods herein solve this technological problem by overlaying non-printing dots that are potentially larger, and have a lower frequency than the frequency of printing halftone dots within the bitmap. This process of generating printing halftone dots can generate, as each printing halftone dot cluster, a higher frequency pattern of printing dots.

In other words, larger single halftone dots (such as dot 110 in FIG. 2 or dots 150 in FIG. 7A) cause the amount of toner applied to a single area to have a relatively high density, which can interfere with the electrostatic attraction of subsequently applied toner (for subsequently applied colors) resulting in an uneven appearance between areas where colors overlap and where they do not. The smaller high-frequency dots reduce toner density and thereby provide less interference to the electrostatic attraction of subsequent colors (and, in turn reduce the uneven appearance found with larger, higher-density halftone dots). However, such high frequency dots can appear unstable or noisy in laser printing. Because the methods and devices herein overlay a lower-frequency pattern of larger non-printing dots 154 (FIG. 7C) on the pattern of high frequency dots 152, the unstable or noisy appearance of conventional high frequency dots is reduced, allowing high frequency dots to be used, without producing an unstable or noisy appearance. This reduces the amount of marking material utilized, without producing unstable or noisy printed output, and provides more uniform distribution of toner with lighter density and better area coverage than high-density single halftone dots, or low frequency dots alone, thereby solving a substantial technological problem that exists today.

Figure 8:
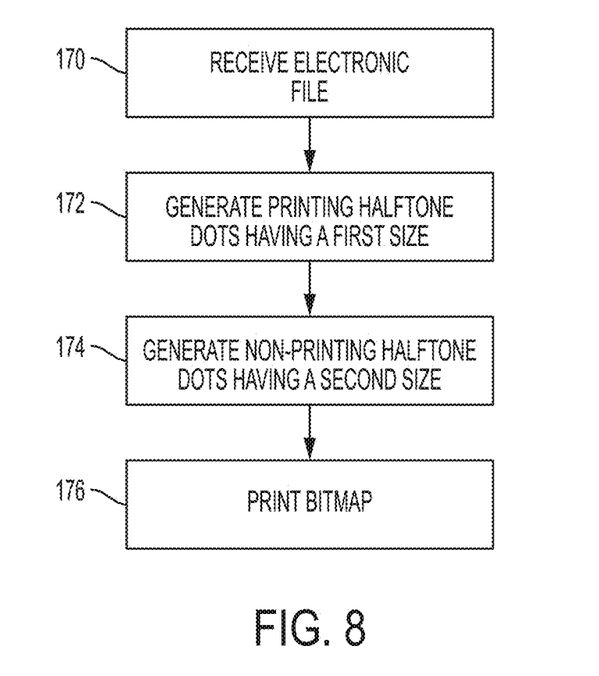
FIG. 8 is a flow diagram of various methods herein.

FIG. 8 is flowchart illustrating exemplary methods herein. In item 170, these exemplary methods automatically receive an electronic file into a special-purpose image processor. Such methods automatically convert the electronic file into a bitmap using the special-purpose image processor by automatically generating printing halftone dots having a first frequency within the bitmap based on locations of colors within the electronic file (item 172); and by automatically generating non-printing dots having a second frequency less than the first frequency within the bitmap (item 174). In other words, in item 174, the methods herein alter the uniform pattern of dots (e.g., 152 in FIG. 7B) to form areas of the uniform pattern of dots that will not print (and these areas are the non-printing dots 154, shown in FIG. 7C). As noted above, the non-printing dots 154 overlaid on the otherwise uniform pattern of dots 152 reduce the unstable or noisy appearance produced by conventional high frequency dots, allowing high frequency dots to be used without producing an unstable or noisy appearance.

The process of generating the non-printing dots within the bitmap in item 174 can include a process of increasing the size of the printing halftone dots until they contact one another, and/or generating printing lines that connect the printing halftone dots to each other within the bitmap. In addition, the process of generating printing halftone dots in item 172 can include a process of generating, as each printing halftone dot cluster, a higher frequency pattern of printing dots, where the higher frequency pattern is a multiple of the lower frequency pattern of the non-printing dots. Also, as shown in FIG. 7C, the non-printing halftone dots 154 can be larger than the halftone dots 152.

Further, in item 176, such methods automatically print the bitmap using a printing device by printing the marking materials on print media where the printing halftone dots are positioned within the bitmap, but not printing the marking materials where the non-printing dots are positioned within the bitmap.

The hardware described herein plays a significant part in permitting the foregoing method to be performed, rather than function solely as a mechanism for permitting a solution to be achieved more quickly, (i.e., through the utilization of a computer for performing calculations). As would be understood by one ordinarily skilled in the art, the processes described herein cannot be performed by a human alone (or one operating with a pen and a pad of paper) and instead such processes can only be performed by a machine (especially when the volume of data being processed, and the speed at which such data needs to be evaluated is considered). For example, if one were to manually attempt to create a bitmap, the manual process would be sufficiently inaccurate and take an excessive amount of time so as to render the manual creation process useless. Specifically, processes such as receiving electronic data streams, creating bitmaps, controlling internal operations of printing devices using a bitmap, etc., requires the utilization of different specialized machines, and humans performing such processing would not produce useful results because of the time lag, inconsistency, and inaccuracy humans would introduce into the results.

As would be understood by one ordinarily skilled in the art, the processes described herein cannot be performed by human alone (or one operating with a pen and a pad of paper) and instead such processes can only be performed by a machine. Specifically, processes such as electronic transmission of data over networks, bitmap creation, printing and fusing using inks and toners, etc., requires the utilization of different specialized machines. Therefore, the processes described above cannot be performed manually, and such processes are integral with the methods herein. Further, such machine-only processes are not mere "post-solution activity" because the bitmap produced is further processed after it is transmitted to the printing engine and printed. In other words, these various machines are integral with the methods herein because the methods cannot be performed without such image processing and printing machines (and cannot be performed by humans alone).

Additionally, the methods herein solve many highly complex technological problems. For example, as mentioned above, to keep the same appearance at each color level, the halftone dot sizes used are smaller, and the amount of toner used is smaller. An issue with high frequency screens is that they can appear unstable or noisy, especially when used in laser printers. If the pattern is stochastic with irregular spacing between the dots, the appearance can be quite noisy. Methods herein solve this technological problem by overlaying a pattern of non-printing dots having the same or lower frequency from the frequency of printing halftone dots within the bitmap. This process can generate, as each printing halftone dot cluster, a higher frequency pattern of printing dots. This reduces the amount of marking material utilized, without producing unstable or noisy printed output, and provides more uniform distribution of toner with lighter density and better area coverage than low frequency dots alone, thereby solving a substantial technological problem that exists today.

Figure 9:
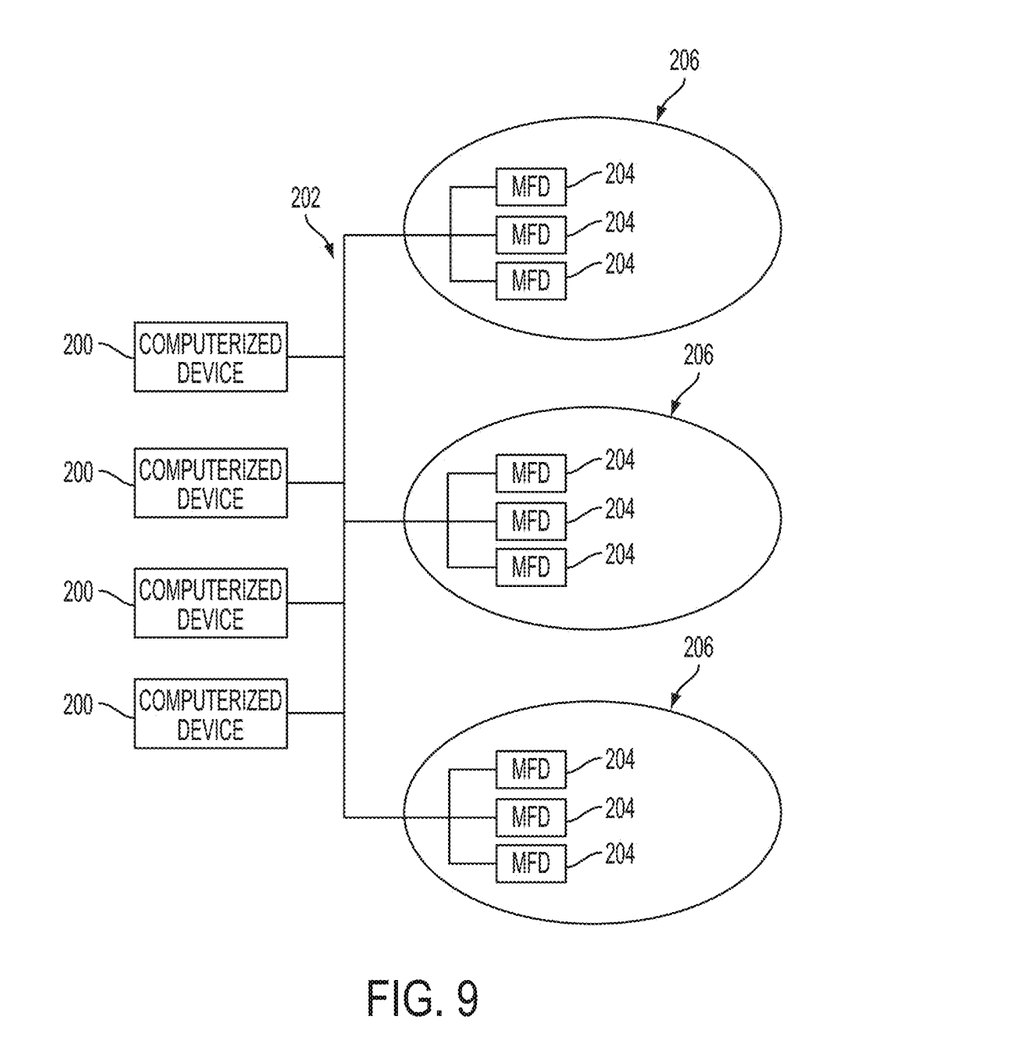
FIG. 9 is a schematic diagram illustrating systems herein.

As shown in FIG. 9, exemplary systems and methods herein include various computerized devices 200, 204 located at various different physical locations 206. The computerized devices 200, 204 can include print servers, printing devices, personal computers, etc., and are in communication (operatively connected to one another) by way of a local or wide area (wired or wireless) network 202.

Figure 10:
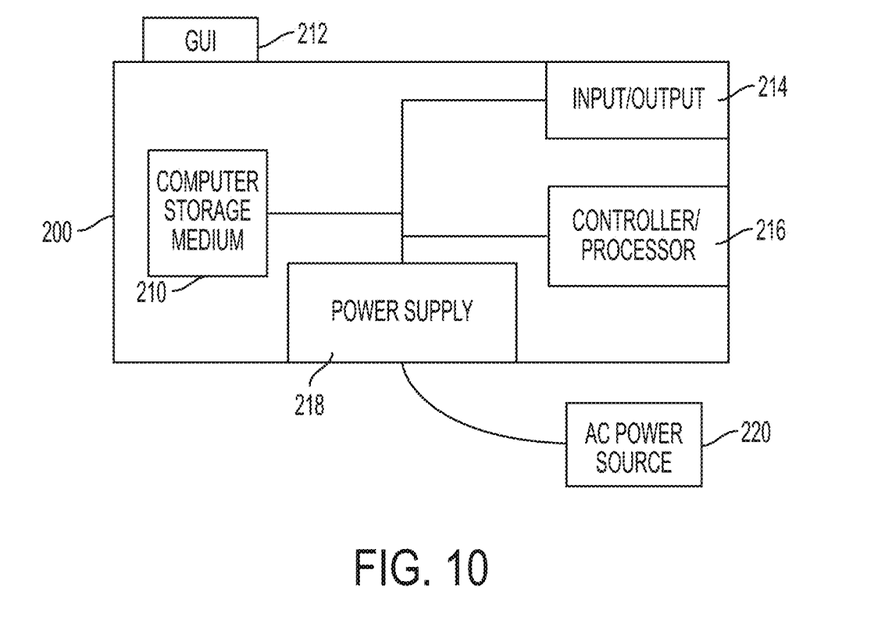
FIG. 10 is a schematic diagram illustrating devices herein.

FIG. 10 illustrates a computerized device 200, which can be used with systems and methods herein and can comprise, for example, a print server, a personal computer, a portable computing device, etc. The computerized device 200 includes a controller/tangible processor 216 and a communications port (input/output) 214 operatively connected to the tangible processor 216 and to the computerized network 202 external to the computerized device 200. Also, the computerized device 200 can include at least one accessory functional component, such as a graphical user interface (GUI) assembly 212. The user may receive messages, instructions, and menu options from, and enter instructions through, the graphical user interface or control panel 212.

The input/output device 214 is used for communications to and from the computerized device 200 and comprises a wired device or wireless device (of any form, whether currently known or developed in the future). The tangible processor 216 controls the various actions of the computerized device. A non-transitory, tangible, computer storage medium device 210 (which can be optical, magnetic, capacitor based, etc., and is different from a transitory signal) is readable by the tangible processor 216 and stores instructions that the tangible processor 216 executes to allow the computerized device to perform its various functions, such as those described herein. Thus, as shown in FIG. 10, a body housing has one or more functional components that operate on power supplied from an alternating current (AC) source 220 by the power supply 218. The power supply 218 can comprise a common power conversion unit, power storage element (e.g., a battery, etc), etc.

Figure 11:
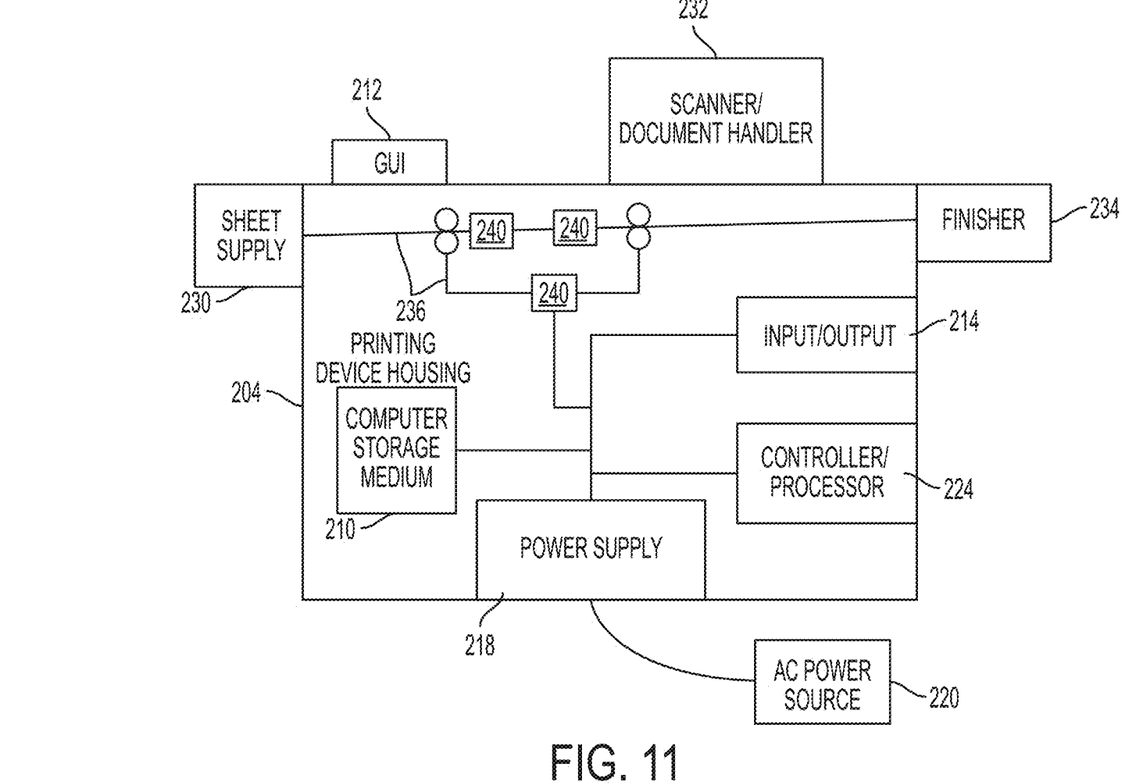
FIG. 11 is a schematic diagram illustrating devices herein.

FIG. 11 illustrates a computerized device that is a printing device 204, which can be used with systems and methods herein and can comprise, for example, a printer, copier, multi-function machine, multi-function device (MFD), etc. The printing device 204 includes many of the components mentioned above and at least one marking device (printing engine(s)) 240 operatively connected to a specialized image processor 224 (that is different than a general purpose computer because it is specialized for processing image data), a media path 236 positioned to supply continuous media or sheets of media from a sheet supply 230 to the marking device(s) 240, etc. After receiving various markings from the printing engine(s) 240, the sheets of media can optionally pass to a finisher 234 which can fold, staple, sort, etc., the various printed sheets. Also, the printing device 204 can include at least one accessory functional component (such as a scanner/document handler 232 (automatic document feeder (ADF)), etc.) that also operate on the power supplied from the external power source 220 (through the power supply 218).

The one or more printing engines 240 are intended to illustrate any marking device that applies a marking material (toner, inks, etc.) to continuous media or sheets of media, whether currently known or developed in the future and can include, for example, devices that use a photoreceptor belt or an intermediate transfer belt, or devices that print directly to print media (e.g., inkjet printers, ribbon-based contact printers, etc.).

As would be understood by those ordinarily skilled in the art, the printing device 204 shown in FIG. 11 is only one example and the systems and methods herein are equally applicable to other types of printing devices that may include fewer components or more components. For example, while a limited number of printing engines and paper paths are illustrated in FIG. 11, those ordinarily skilled in the art would understand that many more paper paths and additional printing engines could be included within any printing device used with systems and methods herein.

Therefore, as shown above, various printing apparatuses herein include (among other components) a special-purpose image processor 224 that receives an electronic file. The special-purpose image processor 224 converts the electronic file into a bitmap by generating printing halftone dots within the bitmap based on locations of colors within the electronic file, and generating non-printing dots within the bitmap. Such printing apparatuses also include any form of printing engine 240 that prints the bitmap by printing marking materials on print media where the printing halftone dots are positioned within the bitmap, but not printing the marking materials where the non-printing dots are positioned within the bitmap.

Thus, the special-purpose image processor 224 can generate the non-printing dots within the bitmap by increasing the size of the printing halftone dots until they contact one another, and/or generating printing lines that connect the printing halftone dots to each other within the bitmap. Also, the special-purpose image processor 224 can generate the printing halftone dots by generating, as each printing halftone dot cluster, a higher frequency pattern of printing dots, where the higher frequency pattern can be a multiple of the lower frequency pattern of the non-printing dots.

Exemplary systems herein include (among other components) one or more special-purpose image processor devices 200 receiving an electronic file. The special-purpose image processor devices 200 convert the electronic file into a bitmap by generating printing halftone dots within the bitmap based on locations of colors within the electronic file, and generating non-printing dots within the bitmap. Such systems also include one or more printing devices 204 directly or indirectly connected to the special-purpose image processor devices 200. The printing devices 204 print the bitmap by printing the marking materials on print media where the printing halftone dots are positioned within the bitmap, but not printing the marking materials where the non-printing dots are positioned within the bitmap.

More specifically, the special-purpose image processor devices 200 can generate the non-printing dots within the bitmap by increasing the size of the printing halftone dots until they contact one another, and/or generating printing lines that connect the printing halftone dots to each other within the bitmap. Also, the special-purpose image processor devices 200 can generate the printing halftone dots at a higher frequency pattern of printing dots, where the non-printing dots are generated to have a lower frequency pattern relative to the higher frequency of the pattern of printing dots. The higher frequency pattern is a multiple of the lower frequency pattern.

While some exemplary structures are illustrated in the attached drawings, those ordinarily skilled in the art would understand that the drawings are simplified schematic illustrations and that the claims presented below encompass many more features that are not illustrated (or potentially many less) but that are commonly utilized with such devices and systems. Therefore, Applicants do not intend for the claims presented below to be limited by the attached drawings, but instead the attached drawings are merely provided to illustrate a few ways in which the claimed features can be implemented.

While some exemplary structures are illustrated in the attached drawings, those ordinarily skilled in the art would understand that the drawings are simplified schematic illustrations and that the claims presented below encompass many more features that are not illustrated (or potentially many less) but that are commonly utilized with such devices and systems. Therefore, Applicants do not intend for the claims presented below to be limited by the attached drawings, but instead the attached drawings are merely provided to illustrate a few ways in which the claimed features can be implemented.

Many computerized devices are discussed above. Computerized devices that include chip-based central processing units (CPU's), input/output devices (including graphic user interfaces (GUI), memories, comparators, tangible processors, etc.) are well-known and readily available devices produced by manufacturers such as Dell Computers, Round Rock Tex., USA and Apple Computer Co., Cupertino Calif., USA. Such computerized devices commonly include input/output devices, power supplies, tangible processors, electronic storage memories, wiring, etc., the details of which are omitted herefrom to allow the reader to focus on the salient aspects of the systems and methods described herein. Similarly, printers, copiers, scanners and other similar peripheral equipment are available from Xerox Corporation, Norwalk, Conn., USA and the details of such devices are not discussed herein for purposes of brevity and reader focus.

The terms printer or printing device as used herein encompasses any apparatus, such as a digital copier, bookmaking machine, facsimile machine, multi-function machine, etc., which performs a print outputting function for any purpose. The details of printers, printing engines, etc., are well-known and are not described in detail herein to keep this disclosure focused on the salient features presented. The systems and methods herein can encompass systems and methods that print in color, monochrome, or handle color or monochrome image data. All foregoing systems and methods are specifically applicable to electrostatographic and/or xerographic machines and/or processes.

The various sets of instructions that are executed by a computerized processor to perform the methods described herein can be any form of computerized application, such as an API, a platform API workflow program, a specialty application, etc., all of which are referred to herein simply as "application" for shorthand.

A raster image processor (RIP) is a component used in a printing system that produces a raster image also known as a bitmap. The bitmap is then sent to a printing device for output. Raster image processing is the process that turns vector digital information into a high-resolution raster image.

A "pixel" refers to the smallest segment into which an image can be divided. Received pixels of an input image are associated with a color value defined in terms of a color space, such as color, intensity, lightness, brightness, or some mathematical transformation thereof. Pixel color values may be converted to a chrominance-luminance space using, for instance, a RBG-to-YCbCr converter to obtain luminance (Y) and chrominance (Cb,Cr) values. It should be appreciated that pixels may be represented by values other than RGB or YCbCr.

Thus, an image input device is any device capable of obtaining color pixel values from a color image. The set of image input devices is intended to encompass a wide variety of devices such as, for example, digital document devices, computer systems, memory and storage devices, networked platforms such as servers and client devices which can obtain pixel values from a source device, and image capture devices. The set of image capture devices includes scanners, cameras, photography equipment, facsimile machines, photo reproduction equipment, digital printing presses, xerographic devices, and the like. The scanning device produces a signal of the scanned image data. Such a digital signal contains information about pixels such as color value, intensity, and their location within the scanned image.

Further, an image output device is any device capable of rendering the image. The set of image output devices includes digital document reproduction equipment and other copier systems as are widely known in commerce, photographic production and reproduction equipment, monitors and other displays, computer workstations and servers, including a wide variety of color marking devices, and the like.

To render an image is to reduce the image data (or a signal thereof) to viewable form; store the image data to memory or a storage device for subsequent retrieval; or communicate the image data to another device. Such communication may take the form of transmitting a digital signal of the image data over a network.

In addition, terms such as "right", "left", "vertical", "horizontal", "top", "bottom", "upper", "lower", "under", "below", "underlying", "over", "overlying", "parallel", "perpendicular", etc., used herein are understood to be relative locations as they are oriented and illustrated in the drawings (unless otherwise indicated). Terms such as "touching", "on", "in direct contact", "abutting", "directly adjacent to", etc., mean that at least one element physically contacts another element (without other elements separating the described elements). Further, the terms automated or automatically mean that once a process is started (by a machine or a user), one or more machines perform the process without further input from any user. In the drawings herein, the same identification numeral identifies the same or similar item.

It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. Unless specifically defined in a specific claim itself, steps or components of the systems and methods herein cannot be implied or imported from any above example as limitations to any particular order, number, position, size, shape, angle, color, or material.

What is claimed is:

1. A method comprising:
receiving an electronic file into a special-purpose image processor;
converting said electronic file into a bitmap using said special-purpose image processor by:
generating printing halftone dots within said bitmap; and
generating non-printing dots within said bitmap, said non-printing dots being larger than said printing halftone dots; and
printing said bitmap using a printing device by:
printing marking materials on print media where said printing halftone dots are positioned within said bitmap; and
not printing said marking materials where said non-printing dots are positioned within said bitmap,
said generating non-printing dots within said bitmap comprising generating printing lines connecting said printing halftone dots within said bitmap.

2. The method according to claim 1, a frequency of said printing halftone dots being a multiple of a frequency of said non-printing dots.

3. The method according to claim 1, said printing halftone dots comprising relatively smaller dot clusters.

4. A method comprising:
receiving an electronic file into a special-purpose image processor;
converting said electronic file into a bitmap using said special-purpose image processor by:
generating printing halftone dots within said bitmap; and
generating non-printing dots within said bitmap, said non-printing dots being larger than said printing halftone dots; and
printing said bitmap using a printing device by:
printing marking materials on print media where said printing halftone dots are positioned within said bitmap; and
not printing said marking materials where said non-printing dots are positioned within said bitmap,
said generating non-printing dots within said bitmap comprising increasing the size of said printing halftone dots until said printing halftone dots contact one another.

5. A method comprising:
receiving an electronic file into a special-purpose image processor;
converting said electronic file into a bitmap using said special-purpose image processor by:
generating printing halftone dots having a first frequency within said bitmap; and
generating non-printing dots having a second frequency less than said first frequency within said bitmap, said non-printing dots being larger than said printing halftone dots; and
printing said bitmap using a printing device by:
printing marking materials on print media where said printing halftone dots are positioned within said bitmap; and not printing said marking materials where said non-printing dots are positioned within said bitmap, said generating non-printing dots within said bitmap comprising generating printing lines connecting said printing halftone dots within said bitmap.

6. The method according to claim 5, a frequency of said printing halftone dots being a multiple of a frequency of said non-printing dots.

7. The method according to claim 5, said printing halftone dots comprising relatively smaller dot clusters.

8. A method comprising:
receiving an electronic file into a special-purpose image processor;
converting said electronic file into a bitmap using said special-purpose image processor by:
generating printing halftone dots having a first frequency within said bitmap; and
generating non-printing dots having a second frequency less than said first frequency within said bitmap, said non-printing dots being larger than said printing halftone dots; and
printing said bitmap using a printing device by:
printing marking materials on print media where said printing halftone dots are positioned within said bitmap; and
not printing said marking materials where said non-printing dots are positioned within said bitmap,
said generating non-printing dots within said bitmap comprising increasing the size of said printing halftone dots until said printing halftone dots contact one another.

9. A printing apparatus comprising:
a special-purpose image processor receiving an electronic file, said special-purpose image processor converting said electronic file into a bitmap by:
generating printing halftone dots within said bitmap, each of said printing halftone dots comprising multiple printing dots; and
generating non-printing dots within said bitmap, said non-printing dots being larger than said printing halftone dots; and
a printing engine printing said bitmap by:
printing marking materials on print media where said printing halftone dots are positioned within said bitmap; and
not printing said marking materials where said non-printing dots are positioned within said bitmap,
said generating non-printing dots within said bitmap comprising generating printing lines connecting said printing halftone dots within said bitmap.

10. The printing apparatus according to claim 9, a frequency of said printing halftone dots being a multiple of a frequency of said non-printing dots.

11. The printing apparatus according to claim 9, said printing halftone dots comprising relatively smaller dot clusters.

12. A printing apparatus comprising:
a special-purpose image processor receiving an electronic file, said special-purpose image processor converting said electronic file into a bitmap by:
generating printing halftone dots within said bitmap, each of said printing halftone dots comprising multiple printing dots; and
generating non-printing dots within said bitmap, said non-printing dots being larger than said printing halftone dots; and
a printing engine printing said bitmap by:
printing marking materials on print media where said printing halftone dots are positioned within said bitmap; and
not printing said marking materials where said non-printing dots are positioned within said bitmap,
said generating non-printing dots within said bitmap comprising increasing the size of said printing halftone dots until said printing halftone dots contact one another.

13. A system comprising:
a special-purpose image processor device receiving an electronic file, said special-purpose image processor device converting said electronic file into a bitmap by:
generating printing halftone dots within said bitmap, each of said printing halftone dots comprising multiple printing dots; and
generating non-printing dots within said bitmap, said non-printing dots being larger than said printing halftone dots; and
a printing device directly or indirectly connected to said special-purpose image processor device,
said printing device printing said bitmap by:
printing marking materials on print media where said printing halftone dots are positioned within said bitmap; and
not printing said marking materials where said non-printing dots are positioned within said bitmap,
said generating non-printing dots within said bitmap comprising generating printing lines connecting said printing halftone dots within said bitmap.

14. The system according to claim 13, a frequency of said printing halftone dots being a multiple of a frequency of said non-printing dots.

15. The system according to claim 13, said printing halftone dots comprising relatively smaller dot clusters.

16. A system comprising:
a special-purpose image processor device receiving an electronic file, said special-purpose image processor device converting said electronic file into a bitmap by:
generating printing halftone dots within said bitmap, each of said printing halftone dots comprising multiple printing dots; and
generating non-printing dots within said bitmap, said non-printing dots being larger than said printing halftone dots; and
a printing device directly or indirectly connected to said special-purpose image processor device,
said printing device printing said bitmap by:
printing marking materials on print media where said printing halftone dots are positioned within said bitmap; and
not printing said marking materials where said non-printing dots are positioned within said bitmap,
said generating non-printing dots within said bitmap comprising increasing the size of said printing halftone dots until said printing halftone dots contact one another.

* * * * *